(12) United States Patent
Castaneda et al.

(10) Patent No.: US 8,349,122 B2
(45) Date of Patent: Jan. 8, 2013

(54) FUSION WELDING FITTINGS WITH WELD BEAD COVER

(75) Inventors: Hector J. Castaneda, Lynwood, CA (US); Jorge Ramirez, Glendale, CA (US)

(73) Assignee: Heateflex Corporation, Santa Clarita, CA (US)

( * ) Notice: Subject to any disclaimer, the term of this patent is extended or adjusted under 35 U.S.C. 154(b) by 1621 days.

(21) Appl. No.: 11/420,132

(22) Filed: May 24, 2006

(65) Prior Publication Data

US 2007/0272340 A1 Nov. 29, 2007

(51) Int. Cl.
*B32B 37/00* (2006.01)
(52) U.S. Cl. ............... 156/304.2; 156/304.6; 156/308.2; 285/288.4
(58) Field of Classification Search .................. 156/73.1, 156/73.5, 157, 158, 304.1, 304.2, 304.3, 156/304.6, 308.2, 309.6, 502, 580, 583.1; 285/285.1, 288.1, 288.4
See application file for complete search history.

(56) References Cited

U.S. PATENT DOCUMENTS

| 286,703 | A | 1/1959 | Hovelmann |
| 2,992,457 | A | 7/1961 | Harrison |
| 307,855 | A | 2/1963 | Patriarca et al. |
| 4,211,259 | A | 7/1980 | Butler |
| 427,842 | A | 7/1981 | Villyard |
| 568,557 | A | 11/1997 | Gardner |
| 6,000,482 | A * | 12/1999 | Michalski ............. 175/57 |
| 6,880,593 | B1 | 4/2005 | Swane |
| 2004/0107019 | A1 * | 6/2004 | Keshavmurthy et al. ..... 700/118 |
| 2006/0086334 | A1 | 4/2006 | Uematsu |

FOREIGN PATENT DOCUMENTS

| DE | 8801976 U | 4/1988 |
| DE | 9107311 | 8/1991 |
| DE | 19632046 A1 | 2/1998 |
| DE | 10229242 C1 | 10/2003 |
| EP | 0662389 A2 | 7/1995 |
| EP | 1203685 A1 | 5/2002 |
| EP | 1637792 A2 | 3/2006 |
| EP | 1640141 A2 | 3/2006 |
| FR | 1185682 | 8/1959 |
| FR | 1308941 | 11/1962 |
| FR | 2611021 | 8/1988 |
| FR | 2872084 | 12/2005 |
| GB | 839743 | 6/1960 |
| JP | 61197224 | 9/1986 |
| JP | 06147388 | 5/1994 |
| JP | 08152091 | 11/1996 |
| JP | 2001021091 A | 1/2001 |
| SU | 1219403 A | 3/1986 |

OTHER PUBLICATIONS

International Search Authority; European Search Report; Feb. 3, 2010.

* cited by examiner

*Primary Examiner* — James Sells
(74) *Attorney, Agent, or Firm* — Kelly & Kelley, LLP

(57) ABSTRACT

A fitting for use in fusion welding mating thermoplastic components includes a weld bead chamber to capture and conceal a bead formed as a result of the fusion weld. The weld bead chamber integrates the bead into the fitting so that the joined parts have a finished look without mechanical polishing or grinding of the completed piece. A stop ledge included in the weld bead chamber prevents over insertion of a pipe or other component into the fitting. A view window in the fitting permits inspection of the finished bead.

20 Claims, 4 Drawing Sheets

FUSION WELDING FITTINGS WITH WELD BEAD COVER

BACKGROUND OF THE INVENTION

The present invention relates generally to the attachment of pipes and thermoplastic fitting components by means of fusion welding. More particularly, the invention relates to improved fittings for joining thermoplastic components.

A number of companies have developed plastic welding equipment which utilizes specialized fitting components to join thermoplastic piping. Plastic welding can be categorized into three types: fusion welding, IR Butt Fusion, and Bead and Crevice Free welding. Fusion welding is used for high purity installations of thermoplastic piping. Thermoplastic piping has grown in industrial usage because of its compatibility with chemicals, its non-corrosive nature, ease of installation, long life, and its smooth internal surfaces. These features of thermoplastic piping make it ideal for high purity applications.

Standard fusion welding involves the heat fusion of a pipe into a female socket fitting. Bonding is achieved by heating the mating surfaces of the pipe end and of the fitting to a temperature above the melt point of the material. The heated parts are then engaged and held together until fused. Fusion occurs when the parts are cooled to below the melt point of the material.

Heating is typically achieved through conductive means via an electric heater that reaches temperatures in the regions of 500° F.±10° (or 260° C.). With the appropriate time, the pipe and fitting surfaces which come in direct contact with the heating tool will melt. The parts are then carefully removed from the heating tool and quickly pushed together thereby fusing the two parts together. Fusion welding is also used for welding a pipe or fitting to a plate in the same manner described above except the plate replaces the female socket.

The relationship between the outside diameter of the pipe and the bore of the fitting or plate is critical for successful fusion welding. Interference is essential when the hot surfaces are mated together. A carefully designed interference fit of the heated mating parts provides consistency of joining. It also results in the appearance of a weld bead as excess melted material is "scraped" off one of the surfaces. This weld bead is undesirable to some users because of its fabricated, unfinished look; and because of the potential for the weld to entrap airborne particles that can be embedded in the material while in a melted state.

The weld bead provides insight to whether the heat fusion joint was properly made. Ideally a double weld should be present and it should not be large in size. As stated above, one disadvantage to the weld bead is that it gives the joint a fabricated appearance. Another disadvantage is that dark spots may appear on the areas of the weld bead due to normal heating or particles which may have been captured when the material was in a melted state. Some manufacturers that use heat fusion to produce products machine the weld bead in order to create a more professional molded look. This adds an additional step to the manufacturing process.

Accordingly, there is a need for an improved fitting that integrates the weld bead into the fitting resulting in the final product having a more finished look. Additionally, an improved fitting that will prevent the common mistake of over inserting a mated component by providing an additional stop to the fitting is needed. Moreover, there is a need for reducing the manufacturing steps involved in heat fusion by eliminating removal of the weld bead through machining. The present invention fulfills these needs and provides other related advantages.

SUMMARY OF THE INVENTION

The present invention relates to a fitting for use in fusion welding of mating thermoplastic components. The fitting comprises a body defining a passageway therethrough and having a weld bead chamber disposed about a portion of the body. The weld bead chamber is configured to receive excess thermoplastic material resulting from a fusion weld joining the body to a mating thermoplastic component. The mating thermoplastic component may be a pipe or a hole in a plate, a wall, a vessel, a pressurized chamber, etc. The fitting is preferably cylindrical in shape, but may also be triangular, square, rectangular, etc.

In one preferred embodiment, the fitting includes a threaded connector on an end opposite the weld bead chamber. The body of the fitting adjacent to the weld bead chamber is configured for interference fit reception within the mating thermoplastic component. The weld bead chamber includes a stop ledge to prevent over insertion of the fitting into the mating thermoplastic component.

In another preferred embodiment, the fitting has a second weld bead chamber adjacent to an end of the body opposite the first weld bead chamber. As in the first embodiment, the body adjacent to either weld bead chamber is configured for interference fit reception with a mating thermoplastic component. Again, the weld bead chamber includes a stop ledge to prevent over insertion of the pipe into the fitting.

The body of the fitting is made from a heat fusible thermoplastic material, such as, polypropylene, polyethylene, polybutylene, polyvinylidene fluoride, or Teflon.

The weld bead chamber includes a window to view the excess thermoplastic material that results from the interference fit between the fitting and the mating thermoplastic component.

The body of the fitting may include a bend between a first end and a second end of the body. In addition, the body of the fitting may include a T-junction between a first end and a second end of the body, where a third opening of the T-junction includes a third weld bead chamber.

A method for fusion welding a fitting to a mating thermoplastic component comprises the step of heating mating surfaces of the fitting and the mating thermoplastic component to a temperature above the melt point of each, typically at least 500° F. Next, surfaces of the fitting and the mating thermoplastic component configured for an interference fit are engaged until a stop ledge in the weld bead chamber until the mating thermoplastic component engages a stop ledge. Excess thermoplastic material removed from either the fitting or the mating thermoplastic component as a result of the interference fit is captured in the weld bead chamber. The engaged parts are then cooled. The excess thermoplastic material may be inspected through the window in the weld bead chamber.

Other features and advantages of the present invention will become apparent from the following more detailed description, taken in connection with the accompanying drawings which illustrate, by way of example, the principles of the present invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
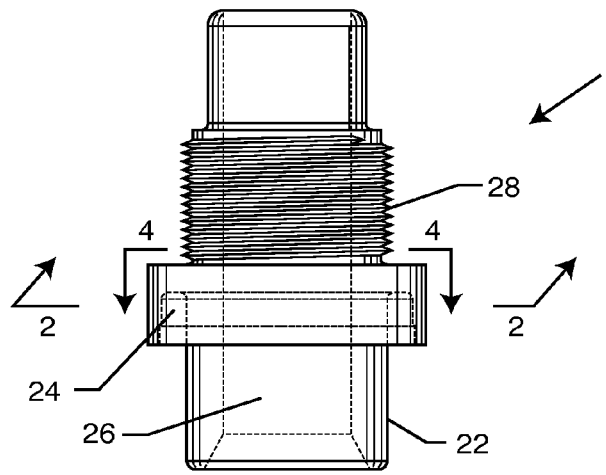
FIG. 1 is an elevational view of a fitting of the present invention showing an internal passageway in dashed lines.
Figure 2:
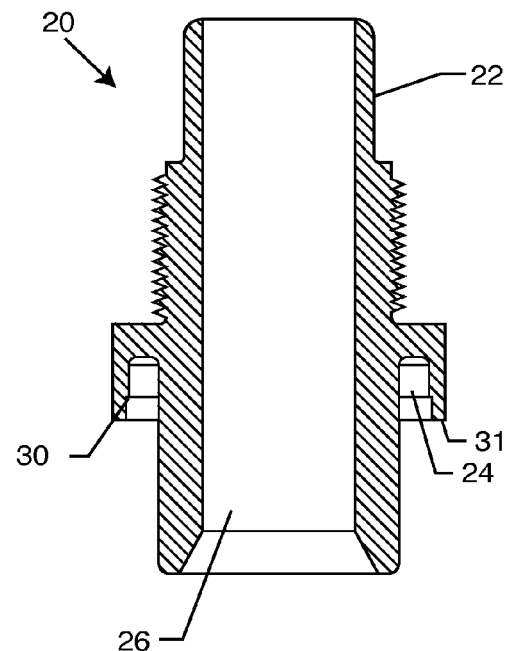
FIG. 2 is a sectional view taken generally along line 2-2 in FIG. 1.
Figure 3:
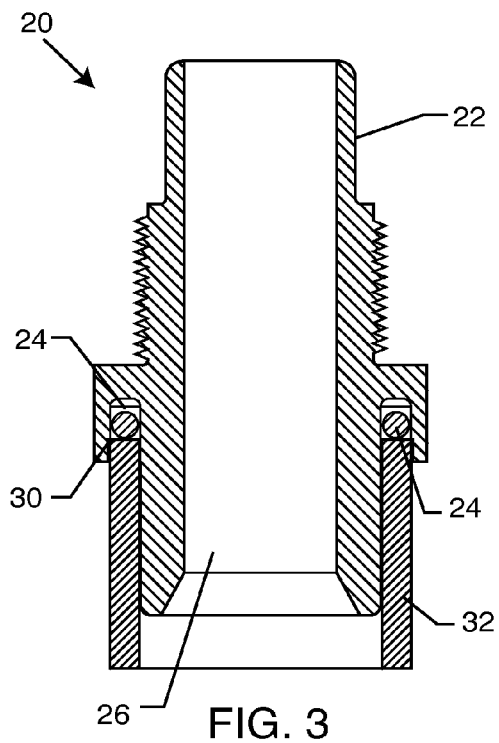
FIG. 3 is a sectional view similar to FIG. 2, additionally depicting the fitting mated to a pipe.
Figure 4:
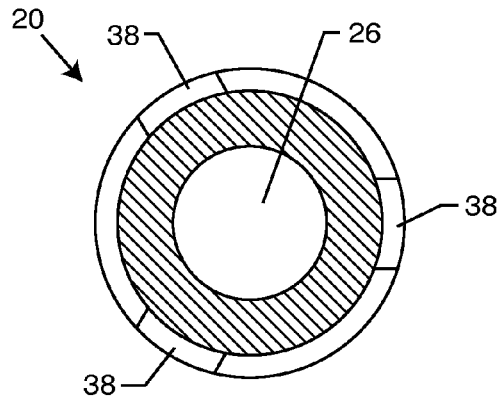
FIG. 4 is a sectional view taken generally along line 4-4 in FIG. 1.
Figure 5:
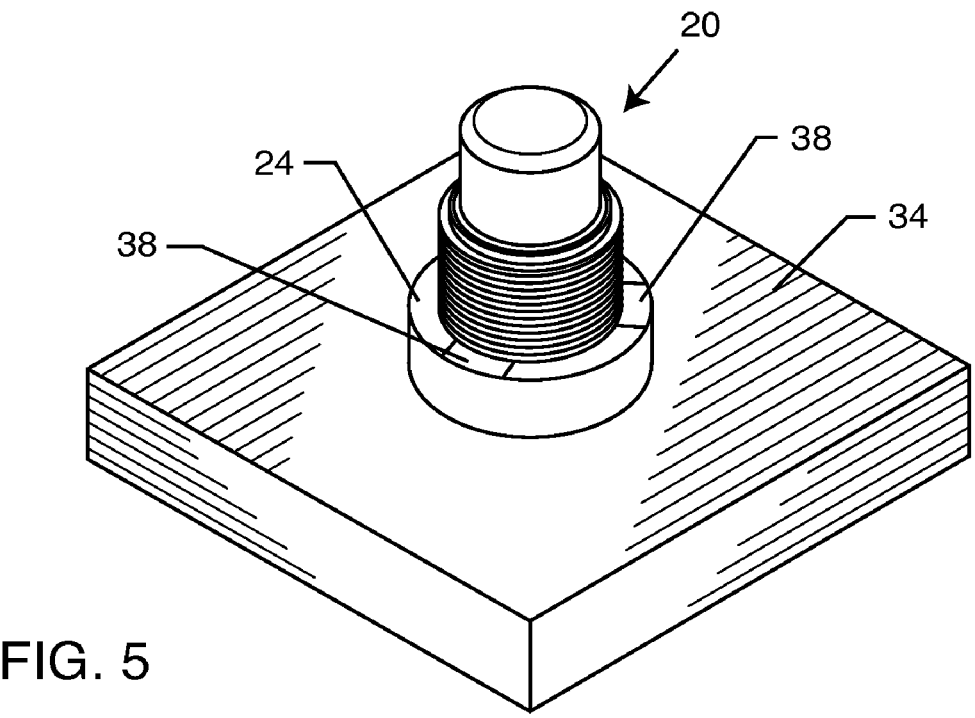
FIG. 5 is a perspective view of the fitting of FIG. 1, fusion welded to a plate.
Figure 6:
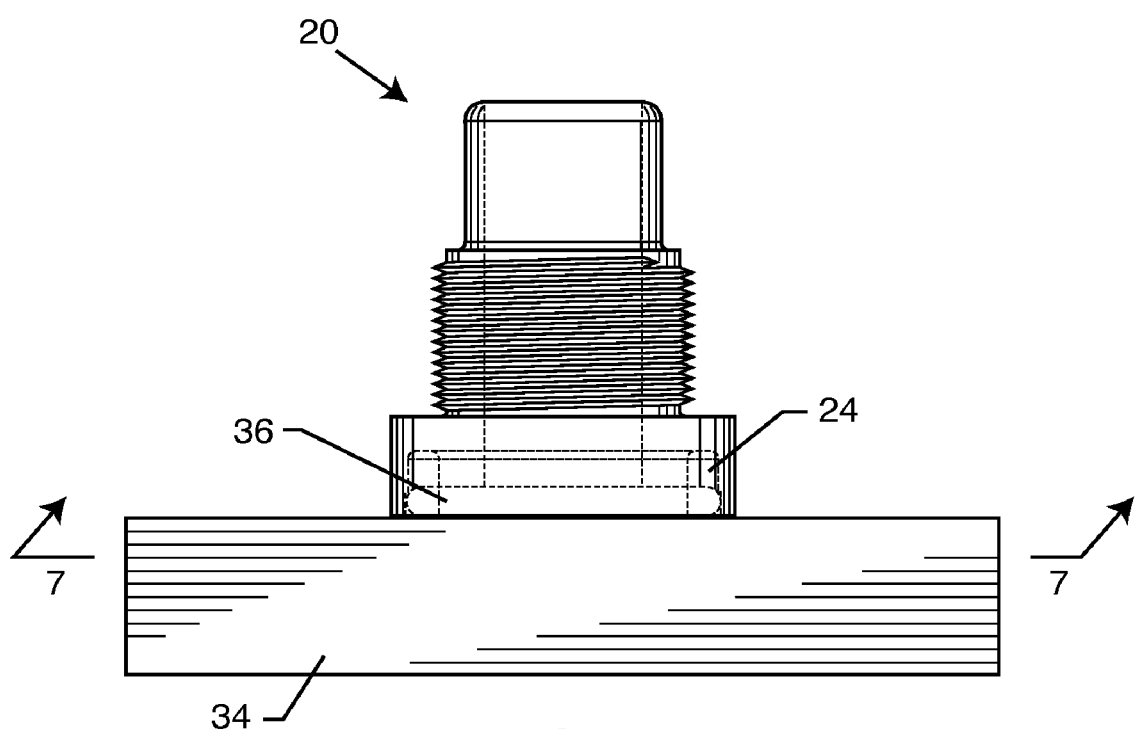
FIG. 6 is an elevational view of the assembly of FIG. 5.
Figure 7:
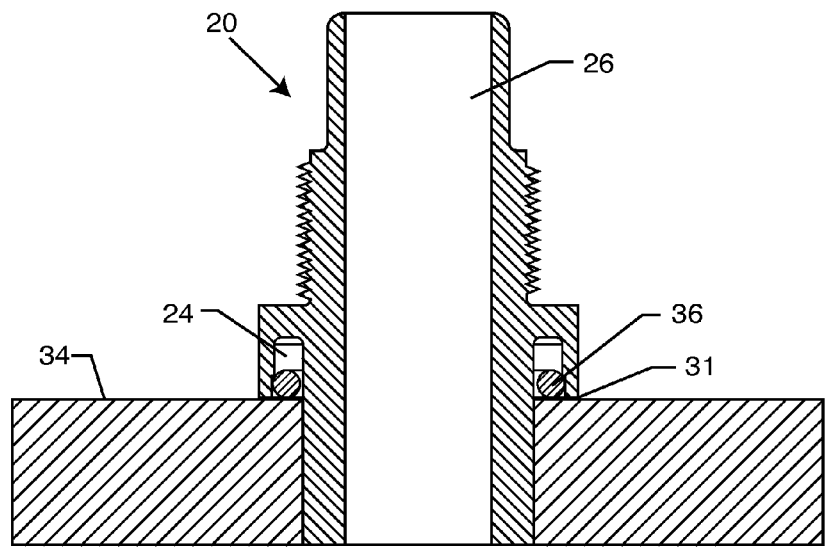
FIG. 7 is a cross-sectional view generally taken along line 7-7 in FIG. 6.

The present invention is directed to improved fittings to be used in fusion welding of mating thermoplastic components. Standard fusion welding results in a weld bead which is undesirable to some users because of its fabricated, unfinished look, and because of the potential for the weld to entrap air borne particles that can be embedded in the material while in a melted state. The improved fittings of the present invention allow manufacturers to continue using fusion welding in their manufacturing steps while giving their products a more finished and injection-molded look by integrating the weld bead, and helping prevent the common mistake of over insertion by providing an additional stop in the fitting. It also reduces manufacturing steps by eliminating removal of the weld bead through machining which some companies current perform on their products.

As illustrated in FIGS. 1 through 7, an improved fitting 20 embodying the present invention comprises a body 22 having a weld bead chamber 24. A passageway 26 runs through the body 22 and provides physical communication between adjoining thermoplastic components, i.e., pipes, vessels, etc., mated to the fitting 20. The body 22 and passageway 26 are preferably cylindrical but may take the form of any shape that is compatible with the shape of a mated thermoplastic component, i.e., triangular, square, rectangular, etc. The fitting 20 also includes a threaded coupling 28 which can receive a cap, flare tube and nut, compression connection with a split ring, ferrule, and nut, or other type of connector (not shown).

The weld bead chamber 24 is preferably a continuous annular ring provided on the outer perimeter of the body 22 and oriented toward an end of the body. However, it may be a discontinuous annular ring, but such construction will not completely integrate and conceal the weld bead. A stop ledge 30 is included in the weld bead chamber 24 to prevent over insertion of the fitting 20 and mated thermoplastic component, i.e., a pipe 32 or a wall/plate 34. The function of the stop ledge 30 will be discussed more fully below.

The fitting 20 of is typically joined by fusion welding to either a pipe 32 or a plate or wall of a vessel 34. When joined to a pipe 32, the end of the fitting 20 adjacent to the weld bead chamber 24 is inserted into the pipe 32. The pipe 32 with which the fitting 20 is mated may be a regular straight pipe or may comprise a multi-junction pipe, i.e., a T-shaped junction, which can be joined to multiple fittings 20.

The diameters of the fitting 20 and the mating pipe 32 are chosen so as to create and interference fit. This means that the outer diameter of the fitting 20 is so close to the inner diameter of the pipe 32 that there is substantial surface contact around the perimeter of the fitting 20. This carefully designed interference fit of the heated mating parts provides consistency of jointing.

Prior to insertion of the fitting 20 into the mating pipe 32, the outer surface of the fitting 20 and the inner surface of the pipe 32 are heated to a temperature above the respective melting points of each. The heated surfaces of the fitting 20 and pipe 32 are then engaged and held together until cool and fused.

The interference fit results in a portion of the surface of the fitting 20 being "scraped" off and accumulating as a bead 36 around the end of the pipe 32. In prior fusion welding processes, this bead 36 would be machined off for a more finished appearance. However, in the present invention, the weld bead chamber 24 on the fitting 20 conceals the bead 36 so that it does not need to be machined off.

In addition, the weld bead chamber 24 includes a stop ledge 30 (FIG. 2) within the weld bead chamber 24 to prevent over insertion of the fitting 20 into the pipe 32. The stop ledge 30 presents a surface against which the end of the mating pipe 32 abuts to prevent insertion of the fitting 20 beyond that point of abutment. This stop ledge 30 is positioned from the end of the fitting 20 so that there is a minimum amount of surface contact between the fitting 20 and the pipe 32 to ensure a strong fusion weld. In cases where the outside diameter of pipe 32 is too large for the end to fit within the weld bead chamber 24, or when it is more practical to simplify the fitting, then a stop ledge edge 31 will prevent over insertion.

The fitting 20 also includes one or more view windows 38 to inspect the quality of the bead 36 after the parts are mated. The appearance of the bead 36 correlates to the quality of the fusion weld between the mated parts. It is important that one be able to inspect the bead 36 to determine the quality of the fusion weld before using the mated pieces.

When the fitting 20 is fusion welded to a plate or wall of a vessel 34, the end of the fitting 20 is inserted into a hole in the plate or wall 34. The manner in which these pieces are mated is nearly as described above: the respective diameters are close enough to create an interference fit; the mating surfaces are heated to above the melt point; the heated surfaces are mated; excess surface material is "scraped" off the surface of the fitting 20 and accumulated as a bead 36 around the surface of the plate or wall 34; the parts cool and fusion weld together; the bead 36 is covered by the weld bead chamber 24. One difference involves that part of the fitting 20 that acts as the stop ledge 30. When welding the fitting 20 to a plate or wall 34, the stop ledge is an edge 31 (FIG. 7) of the weld bead chamber 24 rather than a surface inside the weld bead chamber 24 as described above.

FIGS. 8 through 12 depict another preferred embodiment of the present invention for coupling together opposed ends of two pipes by fusion welding (or more then two as in a tee). In this embodiment, the fitting 40 comprises a body 42 including a passageway 44 therethrough. This fitting 40 includes a first weld bead chamber 46 at a first end and a second weld bead chamber 48 at a second end. These weld bead chambers 46, 48 comprise continuous annular grooves around the inside diameter of the passageway 44. The weld bead chambers 46, 48 may be discontinuous annular grooves, but such construction will not completely integrate and conceal the weld bead. The fitting 40 includes a stop ledge 50 adjacent to each weld bead chamber 46, 48 to perform a similar function as described above. In this embodiment, the stop ledge 50 is included in the passageway 44.

The diameters at each extreme end 52 of the fitting 40 are larger than the diameter of the passageway 44 but smaller then the diameter of the weld bead chambers 46, 48. Because the diameters at each extreme end 52 of the fitting 40 are larger, they will not contact the heater and the extreme end material will not melt. The extreme end 52 diameter is smaller then the diameter of the weld bead chambers 46, 48 to provide a means to keep the bead 52 (discussed below) within the chambers 46, 48.

The fitting 40 is designed to receive a pipe 54 within each end of the fitting 40. For the joining of one pipe 54 to a first end of the fitting 40, the inner diameter of the passageway 44 is closely matched to the outer diameter of the pipe 54 so as to create an interference fit between the two parts. The mating surfaces are then heated and the pipe 54 is inserted into the fitting 40. The interference fit results in excess material being scraped off of the heated surfaces and forming a bead 56 which accumulates in the weld bead chamber 46. The stop ledge 50 prevents over insertion of the pipe 54 into the fitting 40 by abutting against the end of the pipe 54. Again, a view window 58 permits inspection of the bead 56.

Figure 8:
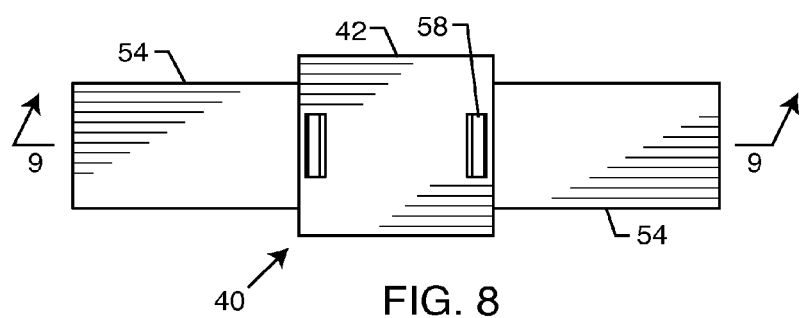
FIG. 8 is a side view of an alternate embodiment of the fitting of the present invention welded to two pipes.
Figure 9:
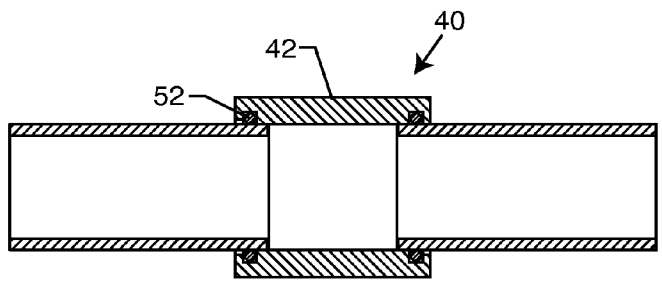
FIG. 9 is a sectional view generally taken along line 9-9 in FIG. 8.
Figure 10:
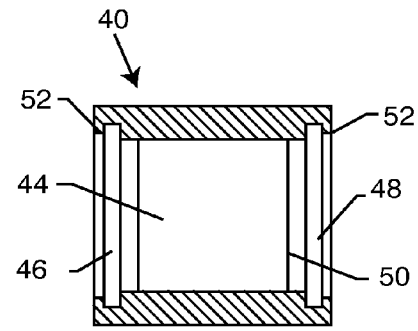
FIG. 10 is a sectional view of the fitting of FIGS. 8 and 9.
Figure 11:
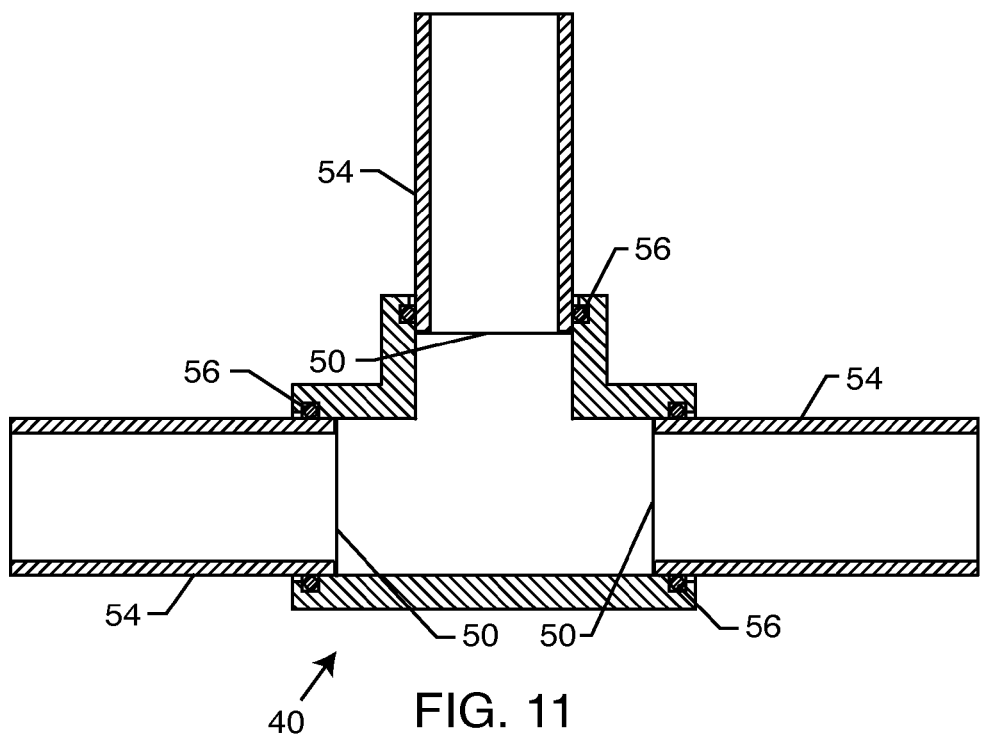
FIG. 11 is a sectional view of a T-shaped fitting embodying the present invention.
Figure 12:
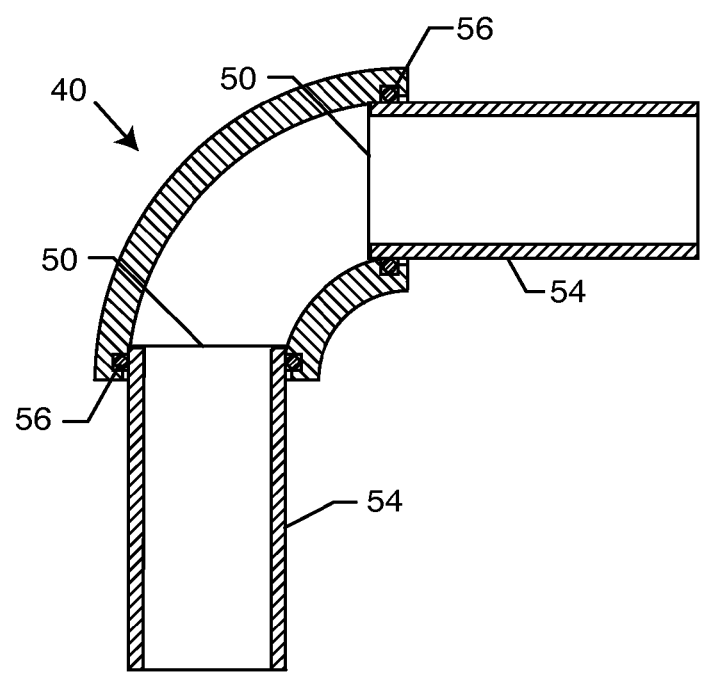
FIG. 12 is a sectional view of an elbow fitting embodying the present invention.

This configuration may be formed integral with a member such as a valve body, a tee (FIG. 11), an elbow (FIG. 12), or a pipe connector (FIGS. 8-10). The pipe connector style fitting 40 has been described above. As shown in FIG. 11, the fitting 40 may include more than two openings and hence, more than two weld bead chambers 46, 48, 60. When more than two pipes 54 are mated to this fitting 40, a corresponding number of weld bead chambers 46, 48, 60 are provided. Similarly, as shown in FIG. 12, a fitting 40 may include a bend or elbow to allow for an angled mating of pipes 50.

The fittings 20, 40 and their mated components, 32, 34, 54 are preferably manufactured from heat fusible thermoplastic materials. Such heat fusible thermoplastic preferably includes Polypropylene (PP), Polyethylene, Polybutylene, Polyvinylidene Fluoride (PVDF), Teflons such as PFA and FEP, and other materials. Fusion welding has become established in industry as a primary joining system for small and medium sizes of Polyvinylidene Fluoride (PVDF) and polypropylene pipe (PP). Fusion welding is typically used for sizes from ½" up to 100 mm or 4" piping diameter. Heating of the components is typically achieved through conductive means via an electric heater that reaches temperatures in the regions of 500° F.±10° (or 260° C.). With the appropriate time, the surfaces of the fittings 20, 40 and mating components 32, 34, 54 which come in direct contact with the heating tool will melt. The parts are then carefully removed from the heating tool and quickly pushed together thereby fusing the two parts together.

Although various embodiments have been described in detail for purposes of illustration, various modifications may be made without departing from the scope and spirit of the invention.

What is claimed is:

1. A fitting for use in the fusion welding of mating thermoplastic components, comprising:
    a body defining a passageway therethrough and configured for interference fit reception around a mating thermoplastic component; and
    a weld bead chamber disposed about a portion of the body to receive excess thermoplastic material resulting from a fusion weld joining the body to the mating thermoplastic component, wherein the weld bead chamber comprises a protrusion around an outer perimeter of the body, the protrusion having a recess oriented toward an end of the body.

2. The fitting of claim 1, wherein the weld bead chamber includes a stop ledge to prevent over insertion of the fitting.

3. The fitting of claim 2, wherein the body is cylindrical in shape and has a threaded coupling adjacent to an end of the body opposite the weld bead chamber.

4. The fitting of claim 3, wherein a portion of the body adjacent to the weld bead chamber is configured for interference fit reception with a thermoplastic pipe or an opening in a thermoplastic surface.

5. The fitting of claim 1, wherein the fitting has a second weld bead chamber adjacent to an end of the body opposite the first weld bead chamber.

6. The fitting of claim 5, wherein a portion of the body adjacent to either weld bead chamber is configured for interference fit reception around the mating thermoplastic component, and wherein either weld bead chamber includes a stop ledge to prevent over insertion of a pipe into the fitting.

7. The fitting of claim 1, wherein the body comprises a heat fusible thermoplastic.

8. The fitting of claim 7, wherein the body is comprised of a polypropylene, polyethylene, polybutylene, polyvinylidene fluoride, or perfluoroalkoxy material.

9. The fitting of claim 1, wherein the fitting includes a window for viewing excess thermoplastic material after the body is fusion welded to the mating thermoplastic component.

10. The fitting of claim 1, wherein the body includes a bend between a first end and a second end of the body.

11. The fitting of claim 1, wherein the body includes a T-junction between a first end and a second end of the body, and wherein the T-junction includes a third weld bead chamber.

12. A fitting for use in the fusion welding of mating thermoplastic components, comprising:
    a body defining a passageway therethrough and configured for interference fit reception around a mating thermoplastic component;
    a weld bead chamber disposed about a portion of the body to receive excess thermoplastic material resulting from a fusion weld joining the body to the mating thermoplastic component, wherein the weld bead chamber comprises a protrusion around an outer perimeter of the body, the protrusion having a recess oriented toward an end of the body;
    a stop ledge within the weld bead chamber for preventing over insertion of the fitting; and
    a window for viewing excess thermoplastic material after the body is fusion welded to the mating thermoplastic component.

13. The fitting of claim 12, wherein the body is cylindrical in shape and has a threaded coupling adjacent to an end of the body opposite the weld bead chamber, and wherein a portion of the body adjacent to the weld bead chamber is configured for interference fit reception within a thermoplastic pipe or an opening in a thermoplastic surface.

14. The fitting of claim 12, wherein the fitting has a second weld bead chamber adjacent to an end of the body opposite the first weld bead chamber, a portion of the body adjacent to either weld bead chamber is configured for interference fit reception around a thermoplastic pipe, and wherein either weld bead chamber includes a stop ledge to prevent over insertion of a pipe into the fitting.

15. The fitting of claim 12, wherein the body comprises a heat fusible thermoplastic taken from the group consisting of polypropylene, polyethylene, polybutylene, polyvinylidene fluoride, or perfluoroalkoxy materials.

16. A method for fusion welding a fitting to a mating thermoplastic component, comprising the steps of:
providing the fitting configured for interference fit reception around the mating thermoplastic component;
heating mating surfaces of the fitting and the mating thermoplastic component to a temperature above the melt point of each;
engaging the heated fitting and the mating thermoplastic component;
capturing excess thermoplastic material removed from either the fitting or the mating thermoplastic component in a weld bead chamber comprising a protrusion around an outer perimeter of the fitting, the protrusion having a recess oriented toward an end of the fitting; and
cooling the fitting and the mating thermoplastic component.

17. The method of claim 16, further comprising the step of inspecting the excess thermoplastic material through a window in the fitting.

18. The method of claim 16, wherein the heating step comprises heating the mating surfaces of the fitting and the mating thermoplastic component to temperatures of at least 490° F.

19. The method of claim 16, wherein the engaging step comprises the step of limiting insertion of the mating thermoplastic component into the fitting.

20. The method of claim 16, further comprising the step of repeating the heating, engaging, capturing, and cooling steps to mate multiple thermoplastic components to the fitting.

* * * * *